Aug. 25, 1925.
1,551,477
D. T. FLEMING
SUBSOILING ATTACHMENT FOR DISK GANG PLOWS
Filed Sept. 5, 1924
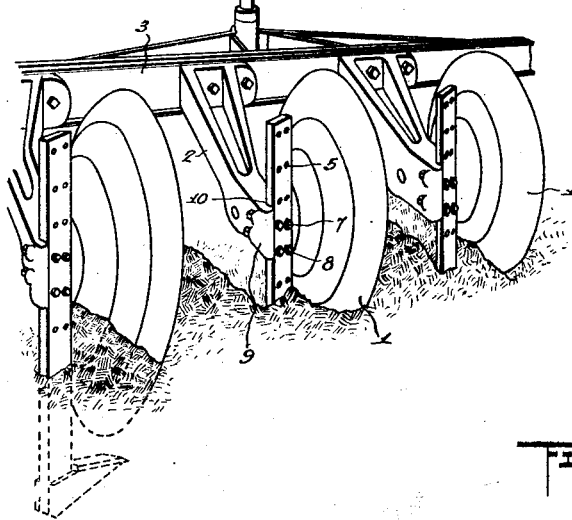
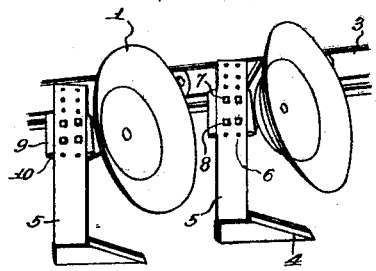
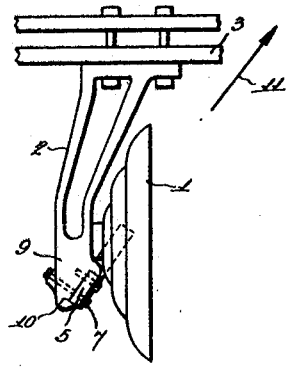
WITNESSES
INVENTOR
D. T. FLEMING.
BY
ATTORNEYS Patented Aug. 25, 1925.

1,551,477

UNITED STATES PATENT OFFICE.

DAVID THOMAS FLEMING, OF LAHAINA, MAUI, TERRITORY OF HAWAII.

SUBSOILING ATTACHMENT FOR DISK GANG PLOWS.

Application filed September 5, 1924. Serial No. 736,113.

*To all whom it may concern:*

Be it known that I, DAVID T. FLEMING, a citizen of the United States, and a resident of Lahaina, Maui, Territory of Hawaii, have invented a new and Improved Subsoiling Attachment for Disk Gang Plows, of which the following is a full, clear, and exact description.

This invention relates to plows and particularly to an improved sub-soiling attachment for disk gang plows and has for an object to provide a construction which will properly function for stirring the earth beneath the plows substantially at the same time that the plows function.

Another object of the invention is to provide a sub-soiling attachment for disk plows wherein the same may be connected to the same bracket or standard as the plow whereby the plow and sub-soiler may function simultaneously.

A still further object of the invention is to provide a sub-soiling attachment for disk plows wherein a vertically adjustable subsoiling structure is aranged in back of each of the plows, the same being positioned to loosen up the soil in the furrow immediately after the plow has passed.

In the accompanying drawing—

Figure 1 is a perspective view showing part of a disk gang plow with sub-soiling attachments embodying the invention applied thereto.

Figure 2 is a fragmentary view showing in elevation the adjustable standard of the sub-soiling attachment.

Figure 3 is a top plan view of a disk plow, sub-soiling attachment and standard with part of the plow frame.

In tilling the soil, it is necessary to plow the same from time to time and in certain localities and for certain crops, it is desired to loosen up the sub-soil beneath what may be termed the top soil. In stirring up the sub-soil, it is undesirable to cause the same to move to the top as this sub-soil is quite often objectionable as a top soil, especially where it is earth known as "hard pan." It is, however, desirable to loosen up this soil in order to provide a porous foundation for receiving and retaining water to carry the crop over a dry spell.

In the present invention means have been provided for turning the soil over in the usual manner by plowing disks and at the same time stir up the hard pan or other subsoil without causing the sub-soil to move to the top. As indicated in the drawing, the various disk plows 1 act to turn over the soil in the desired manner. These plows are, of course, arranged at an angle to the line of draft which is shown by the arrow 11 in Figure 3. The various plows 1 are rotatably mounted on specially constructed brackets 2, which brackets are bolted or otherwise rigidly secured to the frame 3. Substantially any desired number of plows 1 may be mounted on the frame 3 according to the power used, which is usually some form of tractor. The usual practice heretofore has been to use the implement 1 to turn over the soil and then later pull a sub-soiling machine over the plowed ground. This required two operations and required substantially the same power at each operation. In the present instance, the sub-soiling plows or members 4 are provided which may be of any desired construction and which function at the same time as the plows 1. These sub-soiling plows are connected in any desired manner to the attachment or standard 5 which is preferably a rectangular piece of metal of sufficient length to be adjusted vertically in order that the plow 4 may be forced to the desired depth, as for instance, from six to nine inches below the plow 1.

As indicated in Figure 3, the sub-soiling plow 4 is arranged to operate below the center of the furrow and substantially at the same time as the plow 1. The standard 5 is provided with a number of apertures 6 for receiving the various bolts 7 and 8, which bolts are adapted to rigidly clamp the standard or attachment 5 to the bracket 2. The bracket 2 at the outer end in the present invention, is not only made to receive the plow 1 but is provided with a bent portion 9 having a rear face provided with a channel 10 whereby the rectangular attachment 8 may fit therein and be readily bolted in place. By providing a number of series of apertures 6, the attachment 5 may be adjusted vertically so that where desirable or possible, the plow 4 may be caused to operate at a great depth. Where this is not possible, the parts may be adjusted to cause the plow to operate at a less depth below the plow 1.

When the parts are in position as shown in Figures 1 and 3, the plow is pulled in the direction indicated by arrow 11 and the result will be that the soil is turned over in successive layers in the usual manner and in addition, the plow 4 and standard 5 will stir up the earth beneath that engaged by the plows, this stirring action acting to loosen up for the desired depth the under soil without causing the same to come to the surface. This extra sub-soiling attachment will, of course, require slightly more power than if it was eliminated but much less power and expense than if the entire field was operated on by sub-soiling devices heretofore used. Also in sub-soiling devices heretofore used, trash and various objectionable matter is caught by the sub-soiling prongs and prevents the proper action without constantly cleaning the same which reduces the efficiency of the device. By providing the sub-soiling structure shown in the drawing, all of the power used is producing desirable results, namely, stirring up the sub-soil in the furrow where there is nothing to interfere with a proper action of the sub-soiling attachment.

What I claim is:

1. In a disk plow, a holder bracket comprising an elongated member, one end of which is secured to the frame of the plow, and its other end formed with a portion slightly bent forwardly to provide a rear face disposed in a plane corresponding to the line of draft of said plow, a disk plow journaled upon the forward side of the bent portion of the bracket, a bar secured to the rear face of the bracket, and a sub-soil digger carried by the lower end of the bar.

2. In a disk plow, a holder bracket, comprising an elongated member, one end of which is secured to the frame of the disk plow and its other end formed with a slightly bent forwardly portion to provide a rear face disposed in a plane corresponding to the line of draft of the disk plow, said rear face having formed therewith a vertical channel, a disk plow journaled upon the forward side of the bent portion of the bracket, a bar disposed in the channel and secured to the bracket, and a sub-soil digger, carried by the bar.

DAVID THOMAS FLEMING.